(12) United States Patent
Garagnani et al.

(10) Patent No.: US 8,800,532 B2
(45) Date of Patent: Aug. 12, 2014

(54) METHOD OF CONTROLLING KNOCKING IN AN INTERNAL COMBUSTION ENGINE EQUIPPED WITH A DEVICE FOR CONTROLLING THE OPENING OF INLET VALVES

(75) Inventors: Nicola Garagnani, Crespellano (IT); Fabio Sensi, Casalecchio di Reno (IT); Filippo Cavanna, Bologna (IT); Stefano Sgatti, Imola (IT)

(73) Assignee: Magneti Marelli S.p.A., Corbetta (IT)

( * ) Notice: Subject to any disclaimer, the term of this patent is extended or adjusted under 35 U.S.C. 154(b) by 494 days.

(21) Appl. No.: 12/903,766

(22) Filed: Oct. 13, 2010

(65) Prior Publication Data

US 2011/0083640 A1    Apr. 14, 2011

(30) Foreign Application Priority Data

Oct. 14, 2009  (IT) .............................. B02009A0665

(51) Int. Cl.
*F02P 5/00*    (2006.01)

(52) U.S. Cl.
USPC .................. 123/406.29; 123/406.21; 701/111

(58) Field of Classification Search
USPC ................. 123/90.15–90.18, 406.21, 406.26, 123/406.29, 406.45; 701/111
See application file for complete search history.

(56) References Cited

U.S. PATENT DOCUMENTS

| | | | | |
|---|---|---|---|---|
| 4,860,711 A | * | 8/1989 | Morikawa | 123/48 D |
| 5,404,854 A | * | 4/1995 | Kamabora et al. | 123/406.16 |
| 6,390,040 B1 | * | 5/2002 | Hammoud et al. | 123/90.15 |
| 6,971,360 B2 | * | 12/2005 | Katayama | 123/192.1 |
| 8,333,072 B2 | * | 12/2012 | Robinson | 60/602 |
| 2004/0055571 A1 | | 3/2004 | Hashizume et al. | |

FOREIGN PATENT DOCUMENTS

| | | |
|---|---|---|
| DE | 19807488 C1 | 9/1999 |
| EP | 1170489 A2 | 1/2002 |
| EP | 1223319 A1 | 7/2002 |
| GB | 2210930 A | 6/1989 |

OTHER PUBLICATIONS

Apr. 1, 2010 Search Report for Italian Patent App. No. B02009A000665.

* cited by examiner

*Primary Examiner* — Thomas Moulis
*Assistant Examiner* — Elizabeth Hadley
(74) *Attorney, Agent, or Firm* — Howard & Howard Attorneys PLLC

(57) ABSTRACT

A method of controlling knocking in an internal combustion engine equipped with a device for controlling the opening of inlet valves; the control method includes the phases of: determining the occurrence of an excessive knocking in the cylinder of the internal combustion engine; and decreasing the mass of air sucked into the cylinder in which an excessive knocking has occurred by acting on the control device controlling the inlet valves of the cylinder.

13 Claims, 2 Drawing Sheets

METHOD OF CONTROLLING KNOCKING IN AN INTERNAL COMBUSTION ENGINE EQUIPPED WITH A DEVICE FOR CONTROLLING THE OPENING OF INLET VALVES

BACKGROUND OF THE INVENTION

1. Field of the Invention

The present invention relates to a method of controlling knocking in internal combustion engines equipped with a device for controlling the opening of inlet valves.

2. Description of the Related Art

An internal combustion engine with controlled ignition typically includes a number of cylinders, each of which has a piston sliding cyclically inside the cylinder and a spark plug which is cyclically driven by an electronic control unit to stroke a spark between its electrodes and thereby to cause the ignition of the compressed gas inside the cylinder.

The control unit comprises a memory that stores a series of maps that provide the values of driving points of the spark plugs as a function of the top-dead-center. In particular, for each spark plug the maps provide the value of the ignition advance, i.e. the value of the angle between the ignition (i.e. the spark between the spark plug's electrodes) and the top-dead-center or TDC of the piston. If the value of the ignition advance is zero, then the ignition, i.e. the spark between the spark plug's electrodes, occurs precisely at the top-dead-center of TDC or the piston.

Ignition advance values stored in maps contained in the control box are determined during the development of the engine in order to ensure good combustion under all possible operating conditions so as to have good thermal efficiency of the engine while, at the same time, safeguarding the integrity of the engine, i.e. avoiding the presence of excessive phenomena of knocking in the cylinders.

The knocking is an explosive type combustion of part of the air-fuel mixture that takes place before the air-fuel mixture is reached by the front of the flame generated by the spark plug. Following the knocking a series of pressure waves are created, and they travel through the combustion chamber and strike violently against the metal walls. The explosion occurs when specified critical temperature and pressure values inside the chamber are exceeded. These values can vary considerably from engine to engine. When the knocking takes place in the mid-bass systems, it often causes a typical metallic noise, clearly audible, known as "knocking". When the knocking is of significant magnitude it is called "megaknock" and can have disastrous consequences for the integrity of the mechanical parts such as the piston.

The knocking occurs normally when the ignition advance is too great or when a fuel with too low octane is used. The power of an anti-knock fuel is precisely indicated by its octane rating. The knocking can also occur in turbocharged engines when the boost pressure is too high.

The evolution of combustion is influenced by many factors. Among the most important factors are the characteristics of the fuel, the temperature of the engine head, the degradation of the spark plugs whose effect is essentially impossible to predict with precision. Therefore it is necessary to use a knock sensor, which detects the presence of excessive knocking. In case of severe knocking in a cylinder, the control box shall reduce the value of the ignition advance for that cylinder so to eliminate the knocking in the cylinder. In this way the maximum cylinder pressure is reduced and is reached later than the TDCs, making the detonating event less likely.

However, in terms of combustion efficiency, reducing the ignition advance of a cylinder corresponds to a loss in thermodynamic efficiency: the mass of air going into the cylinder and thus the mass of fuel injected are kept constant, but by reducing the ignition advance the combustion efficiency is reduced, i.e. the fraction of chemical energy converted into mechanical energy. This has negative effects on fuel consumption and on the generation of pollutants.

Moreover, in a supercharged internal combustion engine knockings of high intensity might occur (commonly referred to as "megaknock"). Because of their violence, "megaknocks" are particularly dangerous for the integrity of the engine. In the particular case of "megaknock", the pressure peaks that can be achieved within the cylinder are so high that even a few events can jeopardize the integrity of the engine. One of the characteristics of the "megaknock" is that it is an event comparable to a pre-ignition, or an independent self-ignition of the spark produced by the spark plug. However, this has the effect of decreasing the torque generated by the engine causing a "torque-hole" which is clearly noticeable by the driver with a clear deterioration in driving pleasure and comfort. In addition, this action is very slow because at high speeds, the effect of closing the throttle can be felt in the cylinders after a few engine cycles due to the inevitable inertia related to the distance between the throttle and the cylinders and due to the dynamics of emptying of the inlet manifold.

SUMMARY OF THE INVENTION

It is an object of the present invention to provide a method of controlling knocking in an internal combustion engine equipped with a device for controlling the opening of inlet valves, designed to eliminate the aforementioned drawbacks, and which at the same time is inexpensive and easy to implement.

According to the present invention, there is provided a method of controlling knocking in an internal combustion engine equipped with a device for controlling opening of inlet valves. The control method includes the steps of determining the presence of excessive knocking in the cylinders of the internal combustion engine and reducing the mass of air sucked into the cylinder in which an excessive knocking occurs by acting on the device for the control of the opening of the valve that controls the inlet valves of the cylinder.

BRIEF DESCRIPTION OF THE DRAWINGS

Other objects, features and advantages of the present invention will be readily appreciated as the same becomes better understood after reading the subsequent description taken in connection with the accompanying drawings wherein.

DETAILED DESCRIPTION OF THE PREFERRED EMBODIMENT(S)

Figure 1:
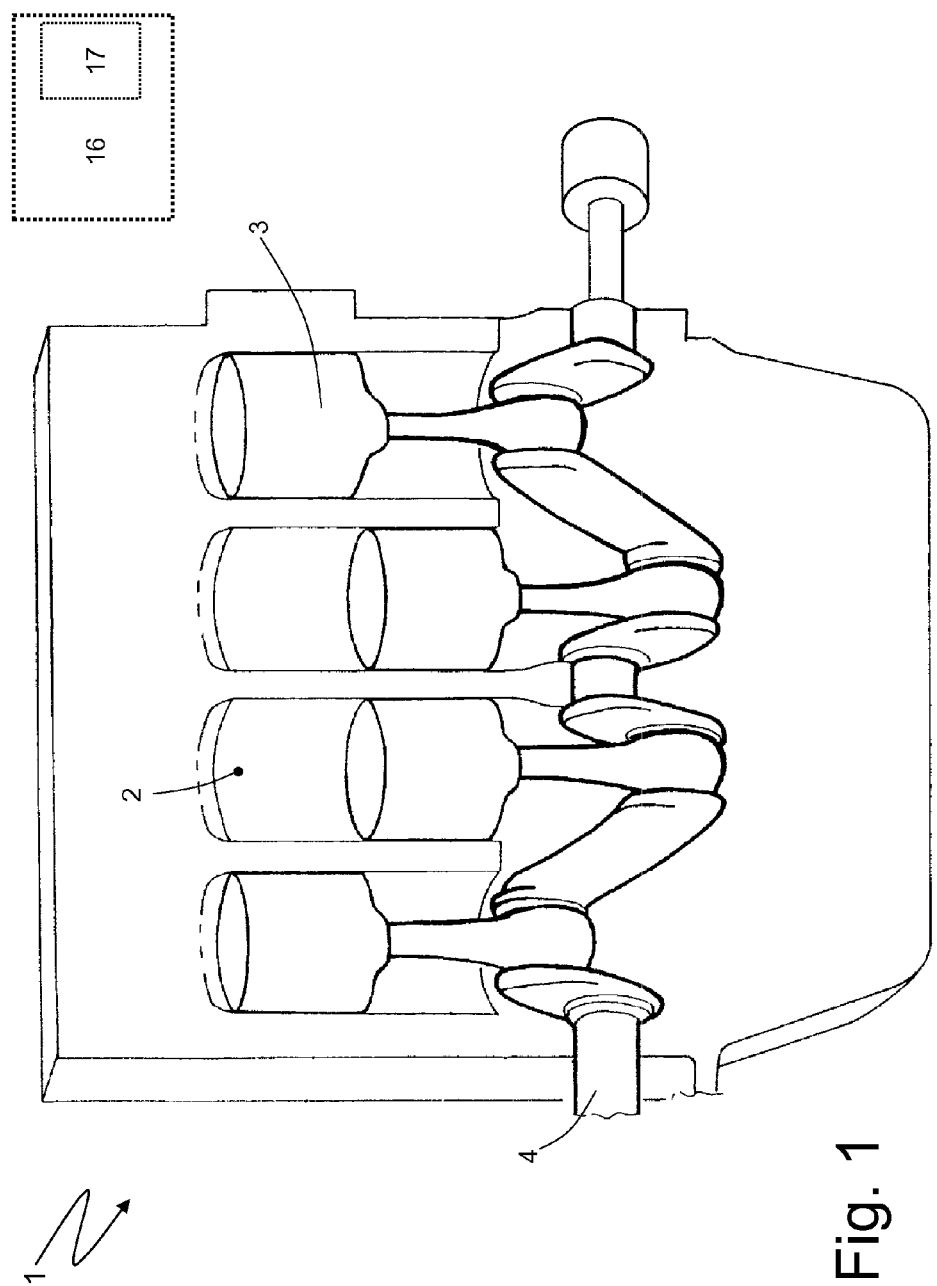
FIG. 1 is a schematic illustration of an internal combustion engine equipped with a control unit that implements the method of controlling knocking object of the present invention.

An internal combustion engine with controlled ignition is generally indicated at 1 in FIG. 1. In the representative embodiment illustrated herein the engine 1 includes four cylinders 2 arranged in line. Each cylinder 2 houses a respective piston 3 which is mechanically connected to a crankshaft 4 through a connecting rod that transmits to the crankshaft 4 the force generated by the combustion within the cylinder 2. However, those having ordinary skill in the art will appreciate from the description that follows that the internal combustion engine 1 may include more or less cylinders than those illustrated in FIG. 1 and the cylinders 2 may be arranged in line, in a V-shape, or in any other configuration as is commonly known in the art without departing from the scope of the present invention.

Figure 2:
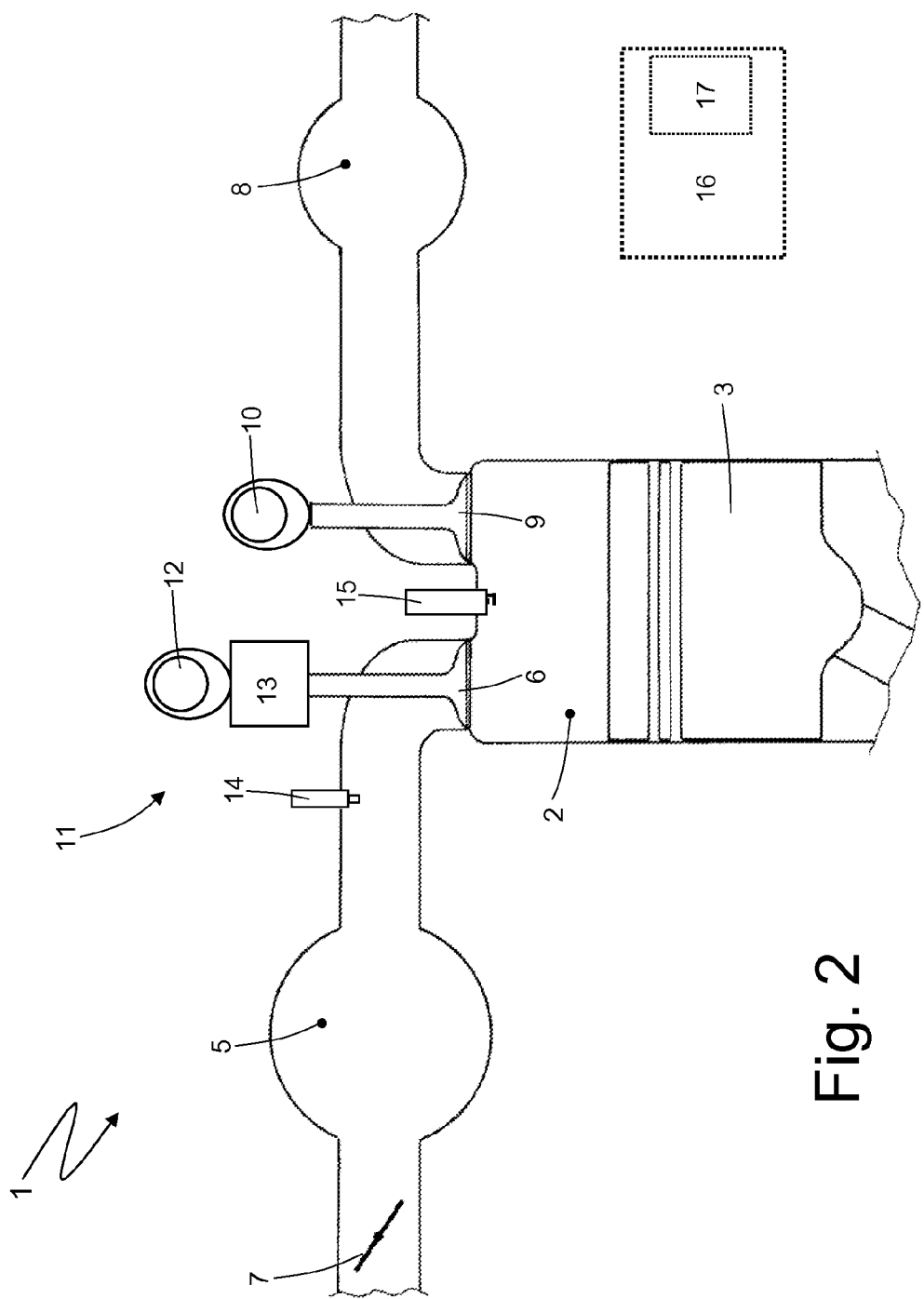
FIG. 2 is a schematic illustration of one of the cylinder of the internal combustion engine of FIG. 1.

A representative, schematic illustration of a single cylinder 2 is illustrated in FIG. 2. As shown in FIG. 2, the internal combustion engine 1 includes an inlet manifold 5 which is connected to each cylinder 2 with at least one, but preferably two, inlet valves 6 (only one of which is illustrated in FIG. 2) and receives fresh air (i.e. air from the external environment) through a throttle valve 7 that can move between a closed position and a fully open position. In addition, the internal combustion engine 1 comprises an exhaust manifold 8 which is connected to each cylinder 2 through at least one, but preferably two, exhaust valves 9 (only one of which is illustrated in FIG. 2). The exhaust manifold 8 is part of an emission pipe (not shown) to emit combustion gases into the air.

The position of each exhaust valve 9 is directly controlled by a cam shaft 10 which receives motion from the crankshaft 4. On the other hand the position of the inlet valves 6 is controlled by a device 11 controlling the opening of the valves which controls the inlet valves 6 by managing the opening and raising angle so as to control the torque generated through the inlet valves 6. The device 11 controlling the opening of the valves uses a conventional cam shaft 12 which receives motion from the crankshaft 4 and for each inlet valve 6 includes an hydraulic actuator 13 electro-driven (i.e. controlled by a solenoid), which is interposed between an inlet valve stem and the cam shaft 12. By piloting opportunely each hydraulic actuator 13 it is possible to adjust the motion transmitted from the cam shaft 12 to the inlet valve stem, and consequently it is possible to adjust the actual lifting of the inlet valve 6. Therefore, the action of the control device 11 allows the variation, for each cylinder 2 and for each engine cycle, of the effective lift of each inlet valve 6 independently from the other inlet valves 6.

For each cylinder 2 there is a corresponding injector 14. According to the representative embodiment illustrated in FIG. 2, the type of injection is indirect and therefore each injector 14 is mounted upstream of the cylinder 2 in the inlet conduit connecting the inlet manifold 5 to the cylinder 2. According to an alternative form of implementation which is not illustrated, the type of injection is a direct one, and therefore each injector 14 is partially disposed within the cylinder 2.

In addition, each cylinder 2 comprises a spark plug 15, which is placed through the roof of the cylinder 2, usually in a central location between the inlet valves 6 and exhaust valves 9 and it is cyclically activated to cause the ignition of the compressed gas inside the cylinder 2 at the end of each stage of compression.

The engine 1 comprises a control unit 16, which supervises the operation of combustion engine 1 and, among other things, pilots the spark plugs 15 to cause the ignition of the gas compressed inside each cylinder 2. The control unit 16 comprises a memory 17 that stores a series of maps providing piloting values for the spark plugs 15 as a function of the current point motor. In particular, for each spark plug 15 (i.e. for each cylinder 2) the maps stored in memory 17 provide a standard ignition advance.

For each combustion of each cylinder 2, the control unit 16 calculates a knocking index IKN representing the level of knocking of the combustion under consideration. The knocking index ranges between a null value, indicating the complete absence of knocking, and a maximum value, indicating a total detonating combustion. The knocking index is calculated by the control unit 16 through an appropriate treatment of a signal coming from one or more knock sensors connected to the control unit 16. For example, each knock sensor includes a measuring device to measure current, which is placed in series with the electrical circuit of a spark plug 15 in order to measure the ionizing current flowing through the spark plug electrodes 15 during the combustion. Alternatively, each knocking sensor includes a pressure gauge that detects the intensity of pressure waves generated in the cylinders 2 of the internal combustion engine 1.

A low rate of knocking is not always negative, since it allows to optimize combustion, and thus maximize the thermal efficiency, while not compromising the integrity of the internal combustion engine 1. For this reason, the control unit 16 could implement an "aggressive" strategy to control the ignition advance, whereby for each cylinder 2 the standard ignition advance provided by the maps stored in memory 17 is increased to get closer to the starting of the knocking, or even to get a low rate of knocking in order to optimize combustion. Typically, this "aggressive" strategy works by increasing gradually the actual ignition advance for each cylinder 2 starting from the standard ignition advance provided by maps stored in memory 17 by means of a linear growth ramp until a desired level of knocking is reached. Once the desired level of knocking is reached, the actual ignition advance is kept fairly constant until the level of knocking does not depart over or under the desired level of knocking.

The control unit 16 compares the knocking index IKN of each cylinder 2 with a first threshold value S1, which indicates the maximum acceptable knocking (which may be zero or slightly above zero as a modest level of knocking may be desirable) and a second threshold value S2, which indicates the presence of knocking events with a high intensity (commonly referred to as "megaknock"). These events, because of their violence, are particularly dangerous for the integrity of the internal combustion engine 1 (preferably, the values of threshold S1 and S2 are not constant but they are a function of the motor point). It is important to note that the "megaknocks" occur normally in the presence of supercharging and thus are not generally present when the inlet is at atmospheric pressure.

When the knocking index IKN of a cylinder 2 is lower than the first threshold value S1, i.e. the actual knocking is below the maximum acceptable, the control unit 16 does not make any kind of intervention to limit the knocking. On the contrary, if the knocking index IKN is significantly lower than the first threshold value S1 (i.e., as mentioned previously, it is below the knocking desired level) the control unit 16 could try to increase the knocking by gradually increasing the actual ignition advance of the cylinder 2 under consideration as described above. On the other hand, when the knocking index IKN of a cylinder 2 exceeds the first threshold value S1, or even worse, is higher even than the second threshold value S2, the control unit 16 acts to limit the knocking in the cylinder 2.

When the knocking index IKN of a cylinder 2 exceeds the first threshold S1 and is below the second threshold value S2, the control unit 16 can perform two types of intervention to limit the knocking in the cylinder 2: it can reduce the ignition advance starting from the engine cycle after the engine cycle in which the presence of an excessive knocking was determined and/or it can decrease the mass of air sucked into the cylinder 2 starting from the engine cycle after the engine cycle in which the presence of an excessive knocking is determined by acting on the control device 11 for the opening of the valves. The control device 11 controls the inlet valves 6 of the cylinder 2. By reducing the density of the charge in the cylinder 2 the energy generated is reduced and the chance of knocking is also reduced. Obviously, when the control unit 16 reduces the mass of air sucked into the cylinder 2 it also carries a concomitant and similar reduction in the mass of fuel injected into the cylinder 2 so as not to vary the air/fuel ratio which must remain equal to a desired value.

To decide which type of intervention to use, the control unit 16 compares the actual ignition advance of the cylinder 2 with a minimum ignition advance (usually but not necessarily equal to the standard ignition advance provided by the maps stored in memory 17) and if the actual ignition advance is greater then the minimum ignition advance then the control unit 16 decreases the actual ignition advance. In this case, the higher the knocking index IKN the more relevant the decrease in the actual ignition advance is. In any case, the control unit 16 does not decrease the actual ignition advance beyond the minimum ignition advance, i.e. the actual ignition advance is never reduced below the minimum ignition advance: when the actual ignition advance is equal to the minimum ignition advance, then the control unit 16 does not decrease further the actual ignition advance and in order to limit the knocking in the cylinder 2 the control unit 16 acts by reducing the mass of air sucked into the cylinder 2 starting from the next engine cycle.

Normally, in case of a severe knocking in a cylinder 2, the control unit 16 starts by reducing the actual ignition advance down to, if necessary, the minimum ignition advance and only when the actual ignition advance has reached the minimum ignition advance the control unit 16 proceeds with the reduction of the amount of air sucked into the cylinder 2. When the knocking is significant (i.e. the knocking index IKN is quite higher than the first threshold value S1 while remaining below the second threshold value S2), the control unit 16 may decide to operate simultaneously both the reduction of the actual ignition advance (which is usually reduced to the minimum ignition advance), and the reduction in the amount of air sucked into the cylinder 2.

The decrease of the ignition advance and/or the decrease in the amount of air sucked into the cylinder 2, in which an excessive knocking is occurring, are higher the higher the knocking. For example, when the knocking index IKN is only slightly higher then the first threshold value S1 the decrease in ignition advance and/or the reduction in the amount of air sucked in are small. And when the knocking index IKN is significantly greater than the first threshold value S1 (although remaining below the second threshold value S2) the decrease in ignition advance and/or the reduction in the amount of air sucked in are high.

When the knocking index IKN of a cylinder 2 is also higher than the second threshold value S2, i.e. in the case of "megaknock", the control unit 16 immediately makes a substantial reduction in the amount of air sucked into the cylinder 2 starting from the next cycle engine by acting on the device 11 for the control of the opening of the valves that controls the inlet valves 6 of cylinder 2. This reduction in the amount of air sucked into the cylinder 2 is always important in order to safeguard the integrity of the internal combustion engine 1. In the case of "megaknock", the control unit 16 does not normally make any intervention on the ignition advance, as the "megaknock" is not influenced by the ignition advance. Also, in case of "megaknock" the control unit 16 may also reduce the boost pressure by acting for example on the wastegate valve of the turbocharger to further reduce the density of the charge in the cylinder 2 and thus better preserve the integrity of the internal combustion engine 1.

The control mode described above is applied individually to each cylinder 2, i.e. for each cylinder 2 a corresponding knocking index IKN is determined and then for each cylinder 2 it is determined whether it is necessary to decrease the ignition advance and/or reduce the mass of air sucked (and consequently the mass of injected fuel) in order to limit an excessive knocking. This makes it possible to take into account the inevitable differences that exist between the various cylinders 2. Differences may result from construction tolerances, or because of the difference in temperature of the walls of the cylinder 2 caused by the different positions of the cylinders 2 inside the internal combustion engine 1. In other words, in order to limit the knocking in a cylinder 2, the control unit 16 decreases the ignition advance and/or the amount of air sucked into the cylinder 2 starting from the next engine cycle but leaving unchanged the ignition advance and or the amount of air sucked into the other cylinders 2 (obviously if other cylinders 2 do not have an excessive knocking).

The method of controlling knocking described above has many advantages.

First, the method of controlling knocking described above is simple and of inexpensive implementation in an electronic control unit of an internal combustion engine equipped with a device for controlling the opening of the inlet valves because it does not require any physical change and commits a modest computing capacity of the control unit 6.

Furthermore, the above-described method of controlling knocking can keep under control the knocking in the different cylinders 2 without significant adverse effects on the thermodynamic efficiency of combustion which is maintained next to the highest possible values with obvious benefits on consumption and containment of pollutants. This result is obtained thanks to the fact that in case of knocking the actual ignition advance is never reduced below the minimum ignition advance which is typically equal to the standard ignition advance provided by the maps stored in memory 17. In this way the combustion in the cylinders 2 never occurs with an actual ignition advance too small and therefore with low thermodynamic efficiency.

In order to reduce the knocking it is possible to act either traditionally by reducing the ignition advance, or through the innovative reduction of the amount of air sucked. In both cases, the corrective action produces a decrease in torque produced in the combustion cylinder 2 on which the corrective action has been applied. If the reduction is not excessive, the total torque produced by the internal combustion engine 1 does not have a downturn noticeable by the driver. However, the advantage of the correction by a reduction in the amount of air sucked is evident: by delaying the ignition advance and by keeping constant the mass of air sucked and the mass of fuel injected into the cylinder 2 which has detonated the thermodynamic efficiency decreases (especially when the actual ignition advance falls below minimum ignition advance), while by reducing the mass of air sucked and the mass of injected fuel without changing the ignition (or rather without reducing the actual ignition advance below the minimum ignition) the thermodynamic efficiency remains approximately unaltered. The control method described above allows to obtain an optimal balance between reducing the ignition advance and reducing the mass of air sucked in case of knocking. Indeed the combustion in the cylinders 2 never occurs with an actual ignition advance which is too small (i.e. smaller than the minimum ignition advance) and therefore with low thermodynamic efficiency.

Finally, in the presence of knocking events of high intensity (commonly referred to as "megaknock"), the above-described method of controlling knocking enables an effective response, extremely fast (it acts as early as the engine cycle after the engine cycle in which the "megaknock" has occurred), and is focused only on the cylinder 2 which presents the problem (i.e. the other cylinders 2 with no knocking continue to operate without any penalty). In other words, the reduction of the mass of air sucked into the cylinder 2 on which the "megaknock" has occurred is achieved with a very fast dynamic and hence less harmful stress on the internal combustion engine 1 and is applied only (or mostly) on the cylinder 2, which presented the problem. In this way, the reduction of total torque delivered by the internal combustion engine 1 is much less important, therefore, less noticeable to the driver.

The invention has been described in an illustrative manner. It is to be understood that the terminology which has been used is intended to be in the nature of words of description rather than of limitation. Many modifications and variations of the invention are possible in light of the above teachings. Therefore, the invention may be practiced other than as specifically described.

What is claimed is:

1. A method of controlling knocking in an internal-combustion engine (1) equipped with a plurality of cylinders (2), a plurality of inlet valves (6) of the cylinders (2), and a device (11) to control opening of the inlet valves (6), wherein the method comprises steps of:

calculating, for each combustion of each of the cylinders (2), a knocking index ($I_{KN}$) representing a level of knocking of the combustion;

comparing the knocking index ($I_{KN}$) with a first threshold value ($S_1$) that indicates a maximum acceptable knocking;

determining presence of knocking in the cylinders (2) when the knocking index ($I_{KN}$) exceeds the first threshold value ($S_1$);

comparing the knocking index ($I_{KN}$) with a second threshold value ($S_2$) that indicates presence of "megaknock" events;

determining the presence of the "megaknock" events in the cylinders (2) when the knocking index ($I_{KN}$) exceeds the second threshold value ($S_2$);

reducing a mass of air sucked into the cylinder (2) in which the knocking occurs by acting on the device (11) for the control of the opening of valves that controls the inlet valves (6) while reducing an ignition advance in the cylinder (2) in which the knocking occurs; and making, in the cylinder (2) in which the "megaknock" occurs, a decrease in an amount of the air sucked by acting on the device (11) for the control of the opening of the valves that controls the inlet valves (6) without carrying out any work on the ignition advance.

2. The control method as set forth in claim 1, wherein the method comprises further a step of reducing the mass of the air sucked into the cylinder (2) starting from an engine cycle after an engine cycle in which there is the knocking.

3. The control method as set forth in claim 1, wherein the method comprises further a step of not decreasing the mass of the air sucked in the cylinders (2) in which the knocking index ($I_{KN}$) does not exceed the first threshold value ($S_1$).

4. The control method as set forth in claim 1, wherein the method comprises further steps of:

establishing a minimum ignition advance;

comparing, in case of the knocking in a cylinder (2), an actual ignition advance of the cylinder (2) to the minimum ignition advance; and decreasing the actual ignition advance to limit the knocking in the cylinder (2) only if the actual ignition advance is greater than the minimum ignition advance.

5. The control method as set forth in claim 4, wherein the method comprises further a step of not decreasing the actual ignition advance beyond the minimum ignition advance.

6. The control method as set forth in claim 5, wherein the method comprises further a step of intervening by reducing the mass of the air sucked into the cylinder (2) in which there is the knocking when the ignition advance is equal to the minimum ignition advance.

7. The control method as set forth in claim 4, wherein the method comprises further steps of:

starting with, in case of the knocking in a cylinder (2), a reduction of the actual ignition advance down to, if necessary, the minimum ignition advance; and proceeding with a reduction in the amount of the air sucked into cylinder (2) in which the knocking occurred only when the actual ignition advance has reached the minimum ignition advance.

8. The control method as set forth in claim 4, wherein the method comprises further a step of operating simultaneously in the cylinder (2) in which the knocking occurs a reduction in the actual ignition advance and amount of the air sucked.

9. The control method as set forth in claim 4, wherein the method comprises further steps of:

determining for each cylinder (2) a standard ignition advance; and gradually increasing the actual ignition advance starting from the standard ignition advance until a desired level of the knocking is reached to optimize the combustion.

10. The control method as set forth in claim 9, wherein the minimum ignition advance is equal to the standard ignition advance.

11. The control method as set forth in claim 1, wherein the method comprises further a step of engaging, together with a decrease of the mass of the air sucked into a cylinder (2), a similar decrease in a mass of fuel injected into the same cylinder (2) to not vary an air/fuel ratio.

12. The control method as set forth in claim 1, wherein operation of the control device (11) allows variation for each cylinder (2) and, for each engine cycle, the actual opening of each inlet valve (6) independently of other inlet valves (6).

13. The control method as set forth in claim 1, wherein the method comprises further a step of reducing, in case of "megaknock," a boost pressure by acting on a turbocharger to further reduce density of charge in the cylinders (2).

* * * * *